United States Patent
Howe

(10) Patent No.: US 9,275,352 B1
(45) Date of Patent: Mar. 1, 2016

(54) SYSTEM AND METHOD TO AUTOMATE LIVERY VEHICLE SCHEDULING FROM AIRLINE ITINERARY DATA

(71) Applicant: MasterCard International Incorporated, Purchase, NY (US)

(72) Inventor: Justin Xavier Howe, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/491,111

(22) Filed: Sep. 19, 2014

(51) Int. Cl.
*G06Q 50/30* (2012.01)
*G06Q 10/06* (2012.01)
*G06Q 10/02* (2012.01)

(52) U.S. Cl.
CPC .................................... *G06Q 10/02* (2013.01)

(58) Field of Classification Search
USPC ...................................... 235/384; 705/6, 7.14
See application file for complete search history.

(56) References Cited

U.S. PATENT DOCUMENTS

| | | | |
|---|---|---|---|
| 2014/0025410 A1* | 1/2014 | Churchman | G06Q 10/06 705/6 |
| 2015/0057837 A1* | 2/2015 | Moore, Jr. | H04L 67/10 701/2 |
| 2015/0081362 A1* | 3/2015 | Chadwick | G06Q 50/30 705/7.14 |

* cited by examiner

*Primary Examiner* — Daniel Hess
(74) *Attorney, Agent, or Firm* — Ballard Spahr LLP

(57) ABSTRACT

A system, method, and computer-readable storage medium to automate livery vehicle scheduling from airline itinerary data retrieved from cardholder spending.

20 Claims, 3 Drawing Sheets

SYSTEM AND METHOD TO AUTOMATE LIVERY VEHICLE SCHEDULING FROM AIRLINE ITINERARY DATA

BACKGROUND

1. Field of the Disclosure

Aspects of the disclosure relate in general to financial services. Aspects include an apparatus, system, method and computer-readable storage medium to automate livery vehicle scheduling from airline itinerary data retrieved from cardholder spending.

2. Description of the Related Art

A payment card is a card that can be used by a cardholder and accepted by a merchant to make a payment for a purchase or in payment of some other obligation. Payment cards include credit cards, debit cards, charge cards, and Automated Teller Machine (ATM) cards.

Payment cards provide the clients of a financial institution ("cardholders") with the ability to pay for goods and services without the inconvenience of using cash. For example, traditionally, whenever travelers leave home, they carried large amounts of cash to cover journey expenditures, such as transportation, lodging, and food. Payment cards eliminate the need for carrying large amounts of currency. Moreover, in international travel situations, payment cards obviate the hassle of changing currency.

Travel is expensive. As a result, payment cards are frequently used to pay for transportation tickets, such as airline or rail tickets. By using a payment card, a cardholder avoids using large amounts of cash, which reduces the risk of loss through theft.

A "livery vehicle" is a term of art in the United States and Canada for a vehicle for hire, such as a taxicab or chauffeured limousine, but excluding a rented vehicle driven by the renter. In some jurisdictions a "livery vehicle" covers vehicles that carry up to seven passengers, but not more, thus including a jitney, but excluding an omnibus or motor coach. This usage stems from the hackney cabs or coaches that could be provided by a livery stable.

SUMMARY

Embodiments include a system, device, method and computer-readable medium to automate livery vehicle scheduling from airline itinerary data retrieved from cardholder spending.

In one embodiment, a system comprises a network interface and a processor. The network interface receives payment card transaction data from an acquirer or travel transaction data from a Global Distribution System (GDS). The payment card transaction or travel transaction data contains a cardholder identifier and a travel itinerary. The travel itinerary is for either a flight or rail carrier; the travel itinerary includes: a passenger name, a carrier name, a carrier transportation identifier, an arrival location, an arrival date, and an arrival time. The processor retrieves a cardholder record from a database using the cardholder identifier. The database is stored on a non-transitory computer-readable storage medium. The cardholder record contains an indicator showing the cardholder has opted-into automatic livery vehicle scheduling. When the cardholder has opted-into automatic livery vehicle scheduling, the network interface transmits an electronic reservation message to a vehicle livery service via the network interface. The electronic reservation message includes the passenger name, the carrier name, the carrier transportation identifier, the arrival location, the arrival date and the arrival time.

DETAILED DESCRIPTION

One aspect of the disclosure includes that the awareness that getting to and from transportation hubs, such as airports and train stations, can be difficult for travelers.

Another aspect of the disclosure is the understanding that many people pay for airfare and train tickets using payment cards. It is understood by those familiar with the art that the term "payment card" includes credit cards, debit cards, charge cards, and Automated Teller Machine (ATM) cards. For the purposes of this disclosure, it is understood that the embodiments described herein apply equally to electronic payments via mobile devices (such as key fobs, mobile phones, tablet computers, and the like), electronic wallets, virtual payment cards, cloud-based payment devices, cashless payment devices/methods, or computers.

Another aspect of the disclosure includes the realization that travel payment transaction and corresponding travel itineraries may be automatically used to detect and automate livery vehicle scheduling for payment cardholders.

Embodiments of the present disclosure detect airline or rail travel itineraries via payment card transaction addenda and automate the ordering of livery vehicles based on the specific transaction addenda. In some embodiments, the system may verify transaction addenda against third party validation data.

In some embodiments, cardholders may opt into the automated livery vehicle service.

The systems and processes are not limited to the specific embodiments described herein. In addition, components of each system and each process can be practiced independently and separately from other components and processes described herein. Each component and process also can be used in combination with other assembly packages and processes.

Figure 1:
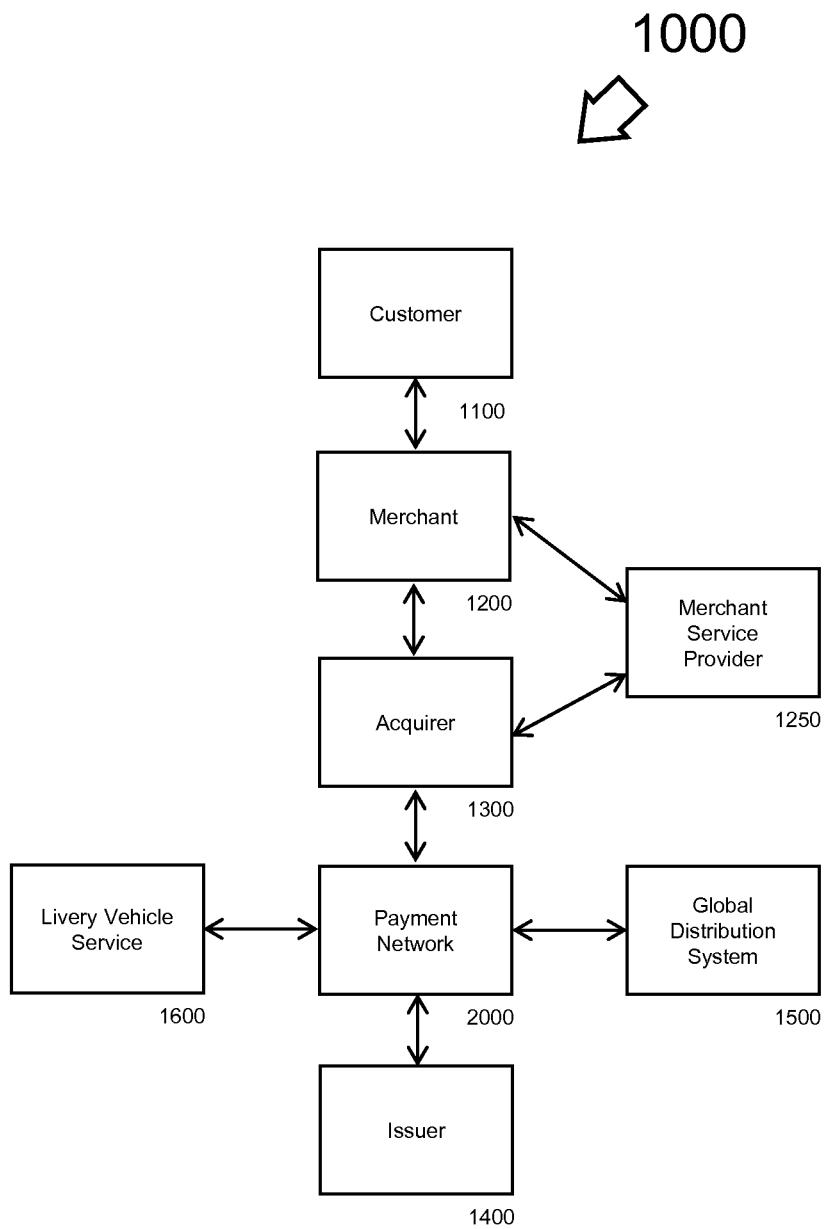
FIG. 1 is a block diagram illustrating a system to automate livery vehicle scheduling from airline itinerary data retrieved from cardholder spending.

FIG. 1 is a block diagram 1000 illustrating a financial transaction and automated order of a livery vehicle using a payment card payment system configured to detect travel itineraries from payment card transaction addenda.

It is understood that the travel itinerary detection and automated livery vehicle order may occur at either at an issuer 1400 or at a payment network 2000. For sake of example only, the present disclosure will describe a payment network-based system, such as the payment system using the MasterCard® interchange, Cirrus® network, or Maestro®. The MasterCard interchange is a proprietary communications standard promulgated by MasterCard International Incorporated for the exchange of financial transaction data between financial institutions that are customers of MasterCard International Incorporated of Purchase, New York. Cirrus is a worldwide interbank network operated by MasterCard International Incorporated linking debit and payment cards to a network of ATMs throughout the world. Maestro is a multi-national debit card service owned by MasterCard International Incorporated.

In a financial payment system, a financial institution called the "issuer" 1400 issues a payment card to a customer 1100, who uses a payment card to tender payment at a merchant 1200. Because the customer 1100 uses a payment card, for the purposes of this disclosure the customer 1100 may also be referred to interchangeably as a "cardholder."

In one example, a cardholder presents the payment card at a merchant 1200. Typically, a merchant 1200 may be a vendor, service provider, or any other provider of goods or services; in this particular example, the merchant 1200 is a provider of a travel-related service, such as an airline, rail service, or travel agency, as is known in the art.

The merchant 1200 is affiliated with a financial institution. This financial institution is usually called the "acquiring bank," "merchant bank" or "acquirer" 1300. When a payment card is tendered at a merchant 1200, the merchant 1200 electronically requests authorization from the acquirer 1300 for the amount of the purchase. The request is performed electronically with the consumer's account information from the magnetic stripe on the payment card or for CHIP enabled payment cards, via the computer chip imbedded within the card. The account information and transaction information are forwarded to transaction processing computers of the acquirer 1300.

Alternatively, an acquirer 1300 may authorize a third party to perform transaction processing on its behalf. In this case, the merchant 1200 will be configured to communicate with the third party. Such a third party is usually called a "merchant service provider" or an "acquiring processor."

Furthermore in some embodiments, a merchant service provider 1250 may connect to an acquirer 1300 on behalf of merchant 1200.

Using a payment network 2000, the computers of the acquirer 1300 or the merchant processor will communicate via an interbank network authorization message or PIN network with the computers of the issuer 1400 to determine whether the consumer's account is in good standing and whether the transaction is likely to be fraudulent.

When a request for authorization is accepted, the available credit balance of cardholder's account is decreased, and a payment is later made to merchant 1200 via acquirer 1300.

After the purchase transaction is captured, the transaction is communicated between the merchant 1200, the acquirer 1300, and the issuer 1400. In some embodiments, there may be a clearing process and a settlement process. A clearing process is a reconciliation process, helping issuers/acquirers learn about the amount to be transferred. A settlement process is a funds transfer process. Typically the clearing process and settlement process are generally performed as batch processes. During the clearing process, the merchant 1200 or acquirer 1300 provides encoded details of the transaction to the payment network 2000. The transaction detail includes interchange rate/category for the transaction, the time/date of the transaction, the type of transaction, where the transaction occurred, the amount of the transaction and the Primary Account Number of the payment card involved in the transaction. Additionally, merchants may attach addendum details to the transaction information. Such addendum information may include, but is not limited to:

Passenger Transport Detail—General Ticket Information;
Passenger Transport Detail—Trip Leg Data;
Passenger Transport Detail—Rail Data;
Vehicle Rental Detail;
Lodging Detail;
Temporary Services;
Shipping/Courier Services;
Electronic Invoice—Transaction Data;
Electronic Invoice—Party Information;
Payment Transaction Addendum Telephony Billing—Summary;
Telephony Billing—Detail;
Travel Agency Detail;
Lodged Account Detail;
Private Label Common Data;
Private Label Line Item;
Healthcare—IIAS Detail;
Corporate Card Common Data Requirements;
Corporate Card Fleet Transaction Information;
Corporate Line Item Detail Generic Detail; or
Any other addenda information known in the art.

Within the above-mentioned addendum information, travel providers may embed the itinerary, including: origination and destination locations (airport or rail station), flight number, train number, and dates and times of airline or rail travel.

During the clearing process, payment network 2000 matches, supplements and/or verifies the travel addenda itinerary with information from Global Distribution System (GDS) 1500 or other travel data provider. As understood in the art, a Global Distribution System 1500 is generally a network that enables transactions between travel service providers (e.g., airlines, train operators, rental car companies) and travel reservation agents in order to provision travel-related services to end users.

Once the travel itinerary is matched/supplemented/verified, the system determines whether the cardholder/customer has already reserved a rental car or livery vehicle service at the flight/train destination. When no rental car or livery vehicle has been scheduled, payment network 2000 automatically contacts a livery vehicle service 1600 and reserves a livery vehicle on behalf of the cardholder.

While the process is discussed in greater detail below, the concepts are best explained by example. Suppose a cardholder 1100 purchases an airline ticket from a merchant 1200 using a payment card. In this example, the merchant 1200 could be a travel agent, ticket service, or an airline. The merchant embeds an airline itinerary within the addenda or GDS, or information, indicating that an airline ticket for a specific flight was purchased, that the flight originates from San Diego, Calif., arriving at John F. Kennedy Airport in New York. Because the system can determine the arrival time and location, it automatically orders a livery vehicle to meet the cardholder in New York.

Figure 2:
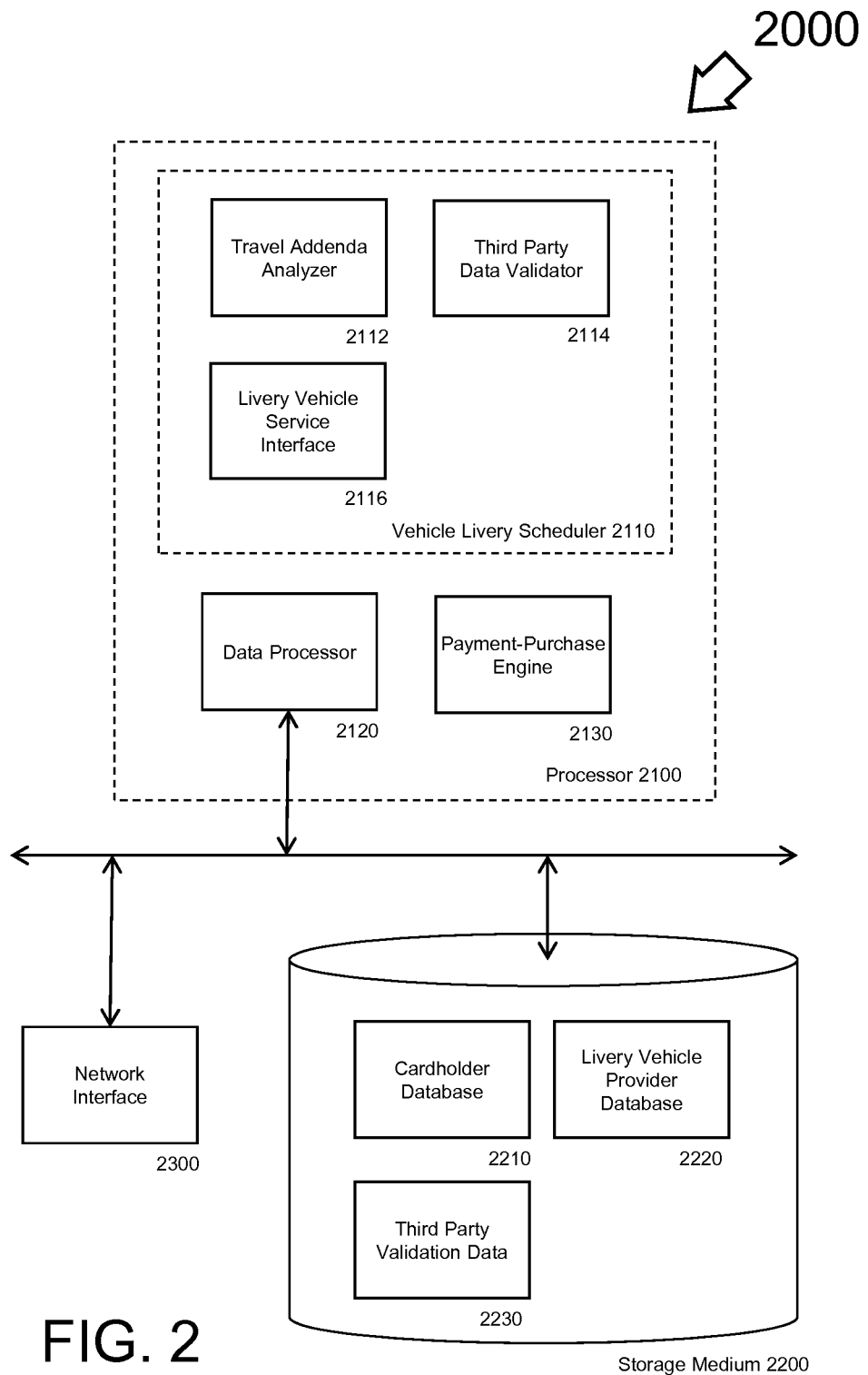
FIG. 2 is an expanded block diagram of an exemplary embodiment of a server architecture of a payment card network embodiment configured to automate livery vehicle scheduling from airline itinerary data retrieved from cardholder spending.

Embodiments will now be disclosed with reference to a block diagram of an exemplary payment network server of FIG. 2, configured to automate livery vehicle scheduling from airline itinerary data, constructed and operative in accordance with an embodiment of the present disclosure.

Payment server may run a multi-tasking operating system (OS) and include at least one processor or central processing unit (CPU) 2100, a non-transitory computer-readable storage medium 2200, and a network interface 2300.

Processor 2100 may be any central processing unit, microprocessor, micro-controller, computational device or circuit known in the art. It is understood that processor 2100 may temporarily store data and instructions in a Random Access Memory (RAM) (not shown), as is known in the art.

As shown in FIG. 2, processor 2100 is functionally comprised of a vehicle livery scheduler 2110, payment-purchase engine 2130, and a data processor 2120.

Data processor 2120 interfaces with storage medium 2200 and network interface 2300. The data processor 2120 enables processor 2100 to locate data on, read data from, and writes data to, these components.

Payment-purchase engine 2130 performs payment and purchase transactions, and may do so in conjunction with vehicle livery scheduler 2110.

Vehicle livery scheduler 2110 is the structure that receives the transaction information from the acquirer, analyzes the transaction information for travel-related addenda, validates the travel-related addenda, and then automatically electronically interfaces with a livery vehicle service. Vehicle livery scheduler 2110 may further comprise: a travel addenda analyzer 2112, a third party data validator 2114, and a livery vehicle service interface 2116.

Travel addenda analyzer 2112 is configured to extract and analyze payment addenda information from transaction data. When travel itinerary information is embedded within payment addenda, the travel addenda analyzer 2112 extracts the itinerary information.

Third party data validator 2114 is a structure configured to validate addenda information against third party validation data 2230. Such third party validation data 2230 may be supplemented from a Global Distribution System 1500. In other embodiments, no travel addenda information is received, and only Global Distribution System or Billing and Settlement Plan (BSP) data is received.

Once the travel addenda analyzer 2112 has extracted itinerary information, and the itinerary information has been validated against third party validation data 2230, the livery vehicle service interface 2116 is configured to select and contact a livery vehicle service 1600 with the cardholder pickup information. The livery vehicle service contact information may be stored in a livery vehicle provider database 2220.

Figure 3:
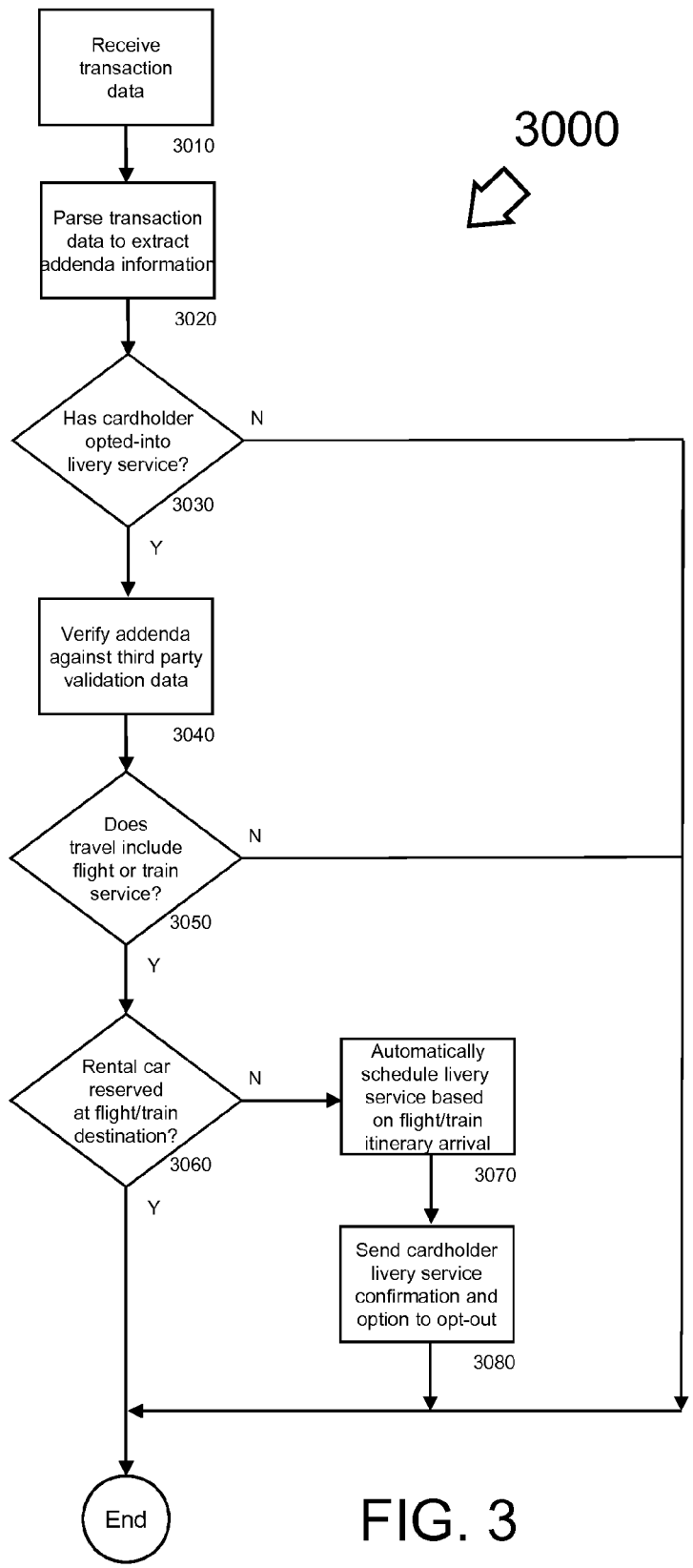
FIG. 3 illustrates a method to automate livery vehicle scheduling from airline itinerary data retrieved from cardholder spending.

The functionality of all the vehicle livery scheduler 2110 structures is elaborated in greater detail in FIG. 3.

These structures may be implemented as hardware, firmware, or software encoded on a computer readable medium, such as storage medium 2200. Further details of these components are described with their relation to method embodiments below.

Non-transitory computer-readable storage medium 2200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. In some embodiments, computer-readable storage medium 2200 may be remotely located from processor 2100, and be connected to processor 2100 via a network such as a local area network (LAN), a wide area network (WAN), or the Internet.

In addition, as shown in FIG. 2, storage medium 2200 may also contain a cardholder database 2210, livery vehicle provider database 2220, and third party validation data 2230. Cardholder database 2210 stores cardholder transaction data received during the clearing process. Cardholder database 2210 may also store cardholder travel itinerary information; such cardholder travel itinerary information may include flight numbers, arrival location, and arrival dates and times. Third party validation data 2230 is any data known in the art provided by a third party for validation of travel data; in some embodiments, the third party validation data 2230 is provided by a Global Distribution System 1500. Moreover, third party validation data 2230 may be used to verify data field validation, data completeness within a transaction, and data accuracy. It is understood by those familiar with the art that one or more of these databases 2210-2230 may be combined in a myriad of combinations.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows payment server to communicate with merchant 1200 and issuer 1400.

We now turn our attention to method or process embodiments of the present disclosure, FIG. 3. It is understood by those known in the art that instructions for such method embodiments may be stored on their respective computer-readable memory and executed by their respective processors. It is understood by those skilled in the art that other equivalent implementations can exist without departing from the spirit or claims of the disclosure.

FIG. 3 illustrates a process 3000 to automate livery vehicle scheduling from airline itinerary data, constructed and operative in accordance with an embodiment of the present disclosure. It is understood by those familiar with the art that process 3000 is a non-real time clearing process, but in alternate embodiments may be a real time process. Conventionally, a clearing process is a non-real time process. Furthermore, it is understood that process 3000 or variations thereof may occur at an issuer 1400 or at a payment network 2000. For the sake of example only, this disclosure will discuss a payment network 2000 embodiment.

At block 3010, payment network 2000 receives transaction data from an acquirer 1300. The transaction data is received electronically via a network interface 2300 and processed using a travel addenda analyzer 2112. The transaction data may be part of data from many transactions received via a batch process. The transaction data may contain a cardholder identifier associated with a cardholder, and addenda for the transaction. A cardholder identifier may be a Primary Account Number (PAN) of a payment card used in the transaction. In addition, the cardholder's name may be retrieved by matching the Primary Account Number or other cardholder identifier with a cardholder record from cardholder database 2210. The addenda may contain travel itinerary information for the cardholder 1100, which may be stored in the cardholder record within cardholder database 2210.

At block 3020, the travel addenda analyzer 2112 of the vehicle livery scheduler 2110 extracts the associated addenda information from transaction data.

Using the cardholder identifier or cardholder name, travel addenda analyzer 2112 looks up a cardholder record in the cardholder database 2210 to determine whether the cardholder has opted-into automatic ordering of a livery vehicle, as determined at decision block 3030. When the cardholder has not opted into the service, method 3000 ends. When the cardholder has opted into the service, method 3000 continues at block 3040.

In some instances, the addenda are incomplete or missing. In such instances, travel addenda analyzer 2112 verifies the addenda information against third party validation data 2230, block 3040. Such data may include flight details, such as: origin, arrival destination, carrier, flight number, departure times, travel date, fare class and stopover code information. As part of the verification process, the addenda are corrected and details are added from third party data, if necessary. Note that when validating addenda data, the GDS records and addenda data may be matched by Primary Account Number, transaction date and transaction amount.

In other embodiments, GDS, or BSP information may be used in addition to, or instead of, the addenda information.

The cardholder's travel itinerary is determined from the addenda information. The travel itinerary includes a carrier name (the name of the airline or rail service), a carrier transportation identifier (flight number or train number), a departure location, a departure date, a departure time, an arrival location, an arrival date, and an arrival time.

At block 3050, vehicle livery scheduler 2110 determines whether the addenda information contains flight or train service.

If the travel information does not include flight or train service, as determined at decision block 3050, the process ends.

If the travel information includes flight or train service, as determined at decision block 3050, travel addenda analyzer 2112 determines whether a rental car or livery vehicle has been reserved by the cardholder at the flight/train destination, block 3060. This determination is made by comparison of the flight/train destination date and time with any existing rental car or livery vehicle reservation found within the cardholder addenda. In some embodiments, such travel information is found within the cardholder database 2210.

If a rental car or livery vehicle has already been reserved, as determined at decision block 3060, the process ends.

When no rental car or livery vehicle has been reserved, the livery vehicle service interface 2116 electronically contacts livery vehicle service 1600 via the network interface 2300 to automatically schedule livery service, block 3070. The method of contact may vary depending upon the form of contact specified by livery vehicle provider database 2220. In one embodiment, livery vehicle service interface 2116 sends an electronic reservation message to the livery vehicle service 1600; the electronic reservation message is encoded with the cardholder name, flight or rail carrier and number, arrival location, arrival date and time. Typically, a cardholder name may be retrieved from the itinerary record. Alternatively, the cardholder name may also be retrieved cardholder database 2210 by matching the Primary Account Number or other cardholder identifier. In some embodiments, the electronic message may further include payment information (such as the cardholder's Primary Account Number) as part of the reservation. In some instances, the electronic message may be a secure electronic mail message, text message, short message service (SMS) message to a mobile telephone number, or via an application running on a cardholder mobile device.

In some embodiments, the livery vehicle service 1600 may be selected from the livery vehicle provider database 2220 based on criteria pre-specified by cardholder. In other embodiments, the livery vehicle service 1600 may be selected based on availability of vehicles at the arrival date and time, price, or promotion offered by the livery vehicle service 1600.

Livery vehicle service 1600 may provide a livery service confirmation number and livery vehicle identifier ("car number"). Once received, the livery service confirmation number and car number are forwarded to the cardholder at block 3080 via electronic contact information predetermined by the cardholder; the electronic contact information may be a telephone number, SMS number, electronic mail address, or other cardholder contact identifier stored in cardholder database 2210. Additionally, the cardholder livery service confirmation may include an option to opt-out or cancel the livery vehicle.

Process 3000 then ends.

It is understood by those familiar with the art that the system described herein may be implemented in hardware, firmware, or software encoded on a non-transitory computer-readable storage medium.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method comprising:
receiving, via a network interface, payment card transaction data from an acquirer or travel transaction data from a Global Distribution System (GDS), the payment card transaction or travel transaction data containing a cardholder identifier and a travel itinerary, the travel itinerary being for either a flight or rail carrier, the travel itinerary including: a passenger name, a carrier name, a carrier transportation identifier, an arrival location, an arrival date, and an arrival time;
retrieving a cardholder record from a database using the cardholder identifier with a processor, the database being stored on a non-transitory computer-readable storage medium, the cardholder record containing an indicator showing the cardholder has opted-into automatic livery vehicle scheduling;
transmitting, when the cardholder has opted-into automatic livery vehicle scheduling, an electronic reservation message to a vehicle livery service via the network interface, the electronic reservation message including the passenger name, the carrier name, the carrier transportation identifier, the arrival location, the arrival date and the arrival time.

2. The processing method of claim 1, further comprising:
receiving, via the network interface, a reservation verification message from the vehicle livery service, the reservation verification message including a confirmation number and a livery vehicle identifier.

3. The processing method of claim 2, wherein the cardholder record contains cardholder electronic contact information.

4. The processing method of claim 3, further comprising:
transmitting, via the network interface, a reservation confirmation message to the cardholder electronic contact information, the reservation confirmation message containing the confirmation number and the livery vehicle identifier.

5. The processing method of claim 4, wherein the electronic reservation message further includes the cardholder identifier.

6. The processing method of claim 5, wherein the cardholder identifier is a payment card Primary Account Number.

7. The processing method of claim 6, further comprising:
determining, with the processor, whether the cardholder has arranged for rental car transportation based at least in part on the payment card transaction data from the acquirer or the travel transaction data from the Global Distribution System, prior to transmitting the electronic reservation message to the vehicle livery service.

8. A system comprising:
a network interface configured to receive payment card transaction data from an acquirer or travel transaction data from a Global Distribution System (GDS), the payment card transaction or travel transaction data containing a cardholder identifier and a travel itinerary, the travel itinerary being for either a flight or rail carrier, the travel itinerary including: a passenger name, a carrier name, a carrier transportation identifier, an arrival location, an arrival date, and an arrival time;

a processor configured to retrieve a cardholder record from a database using the cardholder identifier, the database being stored on a non-transitory computer-readable storage medium, the cardholder record containing an indicator showing the cardholder has opted-into automatic livery vehicle scheduling;

the network interface further configured to transmit an electronic reservation message to a vehicle livery service, when the cardholder has opted-into automatic livery vehicle scheduling, the electronic reservation message including the passenger name, the carrier name, the carrier transportation identifier, the arrival location, the arrival date and the arrival time.

9. The system of claim 8, wherein the network interface is further configured to receive a reservation verification message from the vehicle livery service, the reservation verification message including a confirmation number and a livery vehicle identifier.

10. The system of claim 9, wherein the cardholder record contains cardholder electronic contact information.

11. The system of claim 10, wherein the network interface is further configured to transmit a reservation confirmation message to the cardholder electronic contact information, the reservation confirmation message containing the confirmation number and the livery vehicle identifier.

12. The system of claim 11, wherein the electronic reservation message further includes the cardholder identifier.

13. The system of claim 12, wherein the cardholder identifier is a payment card Primary Account Number.

14. The system of claim 13, wherein the processor is further configured to determine whether the cardholder has arranged for rental car transportation based at least in part on the payment card transaction data from the acquirer or the travel transaction data from the Global Distribution System, prior to the network interface transmitting the electronic reservation message to the vehicle livery service.

15. A non-transitory computer readable medium encoded with data and instructions, when executed by a computing device the instructions causing the computing device to:

receive, via a network interface, payment card transaction data from an acquirer or travel transaction data from a Global Distribution System (GDS), the payment card transaction or travel transaction data containing a cardholder identifier and a travel itinerary, the travel itinerary being for either a flight or rail carrier, the travel itinerary including: a passenger name, a carrier name, a carrier transportation identifier, an arrival location, an arrival date, and an arrival time;

retrieve a cardholder record from a database using the cardholder identifier with a processor, the database being stored on the non-transitory computer-readable storage medium, the cardholder record containing an indicator showing the cardholder has opted-into automatic livery vehicle scheduling;

transmit, when the cardholder has opted-into automatic livery vehicle scheduling, an electronic reservation message to a vehicle livery service via the network interface, the electronic reservation message including the passenger name, the carrier name, the carrier transportation identifier, the arrival location, the arrival date and the arrival time.

16. The non-transitory computer readable medium of claim 15, the instructions further causing the computing device to:
receive, via the network interface, a reservation verification message from the vehicle livery service, the reservation verification message including a confirmation number and a livery vehicle identifier.

17. The non-transitory computer readable medium of claim 16, wherein the cardholder record contains cardholder electronic contact information.

18. The non-transitory computer readable medium of claim 17, the instructions further causing the computing device to:
transmit, via the network interface, a reservation confirmation message to the cardholder electronic contact information, the reservation confirmation message containing the confirmation number and the livery vehicle identifier.

19. The non-transitory computer readable medium of claim 18, wherein the electronic reservation message further includes the cardholder identifier.

20. The non-transitory computer readable medium of claim 19, wherein the cardholder identifier is a payment card Primary Account Number.

* * * * *